US011656385B2

(12) United States Patent
Rudolph et al.

(10) Patent No.: US 11,656,385 B2
(45) Date of Patent: May 23, 2023

(54) FREEFORM FRESNEL SURFACE, METHOD FOR PRODUCING A FREEFORM FRESNEL SURFACE AND METHOD FOR CREATING A CONSTRUCTION DATASET

(71) Applicant: tooz technologies GmbH, Aalen (DE)

(72) Inventors: Guenter Rudolph, Jena (DE); Georg Michels, Aalen (DE); Wolf Krause, Essingen (DE)

(73) Assignee: tooz technologies GmbH, Aalen (DE)

( * ) Notice: Subject to any disclaimer, the term of this patent is extended or adjusted under 35 U.S.C. 154(b) by 1178 days.

(21) Appl. No.: 16/314,562

(22) PCT Filed: Jun. 16, 2017

(86) PCT No.: PCT/EP2017/064824
§ 371 (c)(1),
(2) Date: Dec. 31, 2018

(87) PCT Pub. No.: WO2018/001757
PCT Pub. Date: Jan. 4, 2018

(65) Prior Publication Data
US 2019/0250311 A1 Aug. 15, 2019

(30) Foreign Application Priority Data

Jul. 1, 2016 (DE) .......................... 102016112099.5
Aug. 26, 2016 (DE) .......................... 102016115937.9

(51) Int. Cl.
*G02B 3/08* (2006.01)
*B23B 5/36* (2006.01)
(Continued)

(52) U.S. Cl.
CPC .................. *G02B 3/08* (2013.01); *B23B 1/00* (2013.01); *B23B 5/36* (2013.01); *B23B 27/20* (2013.01);
(Continued)

(58) Field of Classification Search
CPC .... G02B 5/189; G02B 5/1895; G02B 5/1885; G02B 5/188; G02B 5/1876; G02B 5/09;
(Continued)

(56) References Cited

U.S. PATENT DOCUMENTS 5,369,415 A 11/1994 Richard et al.
6,070,980 A 6/2000 Obara et al.
(Continued)

FOREIGN PATENT DOCUMENTS

| CN | 201464664 U | 5/2010 |
| CN | 101916009 A | 12/2010 |
| JP | H04248501 A | 9/1992 |

OTHER PUBLICATIONS

Li, C.J. et al.: "Ultra-precision machining of Fresnel lens mould by single-point diamond turning based on axis B rotation", The International Journal of advanced manufacturing technology, Springer, London, Bd. 77, Nr. 5, Oct. 29, 2014, pp. 907-913, XP035459196, 7 pages.
(Continued)

*Primary Examiner* — Travis S Fissel
(74) *Attorney, Agent, or Firm* — Skaar Ulbrich Macari, P.A.

(57) ABSTRACT

A method for producing a freeform Fresnel surface having a number of Fresnel facets with a respective Fresnel segment surface and a trailing edge includes the production of the freeform Fresnel surface via machining processing of a starting body based on the construction data for the freeform Fresnel surface. With the aid of the circular cylinder casing surfaces and/or cone casing surfaces, the projection of the edges of the Fresnel facets on the x-y-plane represent circular paths for the creation of the construction data.

19 Claims, 12 Drawing Sheets

(51) Int. Cl.
  *B29D 11/00* (2006.01)
  *G02B 27/00* (2006.01)
  *G02C 7/08* (2006.01)
  *B23B 1/00* (2006.01)
  *G02B 27/01* (2006.01)
  *B23B 27/20* (2006.01)

(52) U.S. Cl.
  CPC .... *B29D 11/00269* (2013.01); *G02B 27/0012* (2013.01); *G02B 27/0172* (2013.01); *G02C 7/086* (2013.01); *G02B 2027/0178* (2013.01)

(58) Field of Classification Search
  CPC ........ G02B 2027/0178; G02B 27/0012; G02B 27/0172; G02B 3/08; B29D 11/00288; B29D 11/00278; B29D 11/00269; B23B 27/20; B23B 5/36; B23B 1/00
  USPC .......................... 359/851, 571, 457, 741–743
  See application file for complete search history.

(56) References Cited

U.S. PATENT DOCUMENTS 6,204,974 B1    3/2001  Spitzer
9,170,425 B1*  10/2015  Harrison ............ G02B 27/0172
2002/0071187 A1  6/2002  Kono
2008/0025667 A1  1/2008  Amitai
2010/0260455 A1 10/2010  Pascal et al.
2012/0002294 A1  1/2012  Dobschal et al.
2012/0002295 A1  1/2012  Dobschal et al.
2012/0067418 A1*  3/2012  Hornung .................. G02B 3/08
                                            264/319

OTHER PUBLICATIONS

Jiwang, Yan et al.: "Micro grooving on single-crystal germanium for infrared Fresnel lenses", Journal of micromechanics & microengineering, Institute of physics publishing, Bristol, GB, Bd. 15, Nr. 10, Aug. 19, 2005, pp. 1925-1931, XP020091383, 7 pages.

Office Action to the corresponding Chinese Patent Application No. 201780038989.7 rendered by the China National Intellectual Property Administration (CNIPA) dated Dec. 11, 2020, 12 pages.

International Preliminary Report on Patentability rendered by the International Bureau of WIPO for PCT/EP2017/064824, dated Jan. 10, 2019, 9 pages.

* cited by examiner (Stand der Technik)

(Stand der Technik)

(Stand der Technik)

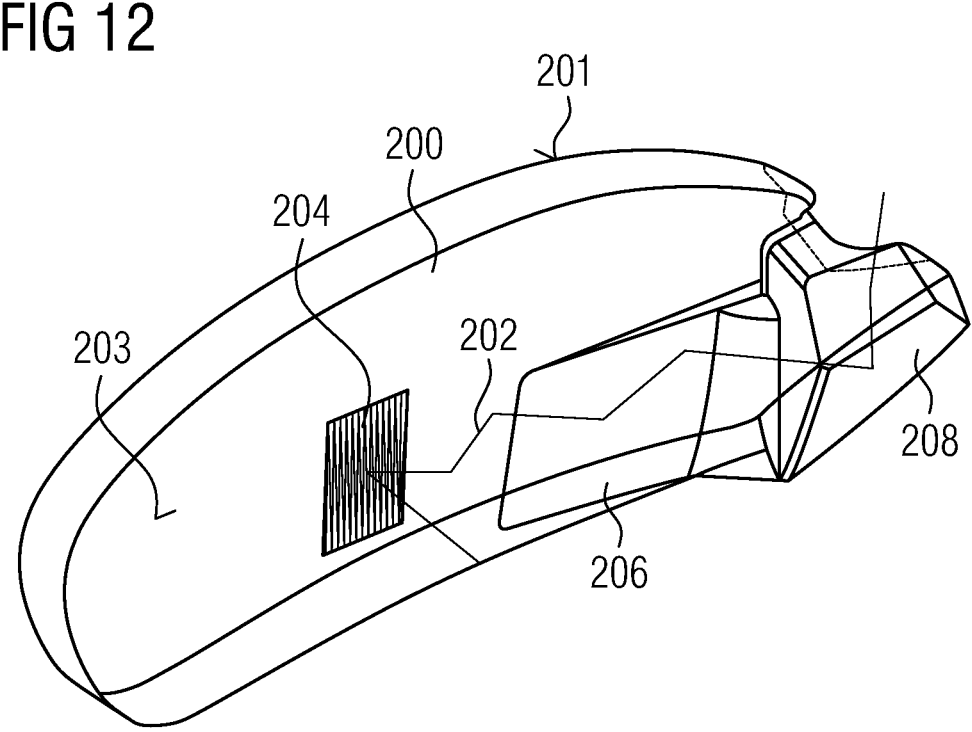

FREEFORM FRESNEL SURFACE, METHOD FOR PRODUCING A FREEFORM FRESNEL SURFACE AND METHOD FOR CREATING A CONSTRUCTION DATASET

PRIORITY

This application claims the benefit of German Patent Application No. 10 2016 112 099.5, filed on Jul. 1, 2016, and German Patent Application No. 10 2016 115 937.9, filed on Aug. 26, 2016, both of which are hereby incorporated herein by reference in their entirety.

FIELD

The present invention relates to a freeform Fresnel surface and to a method for producing a freeform Fresnel surface by way of machining a base body. The invention also relates to a method for creating a construction dataset for the production of a freeform Fresnel surface and to a spectacle lens.

BACKGROUND

What is referred to as a freeform Fresnel surface is a freeform surface which is described by a polynomial and which is formed by multiple offsets by a preferably constant absolute value in the direction of its z-axis and by the corresponding cut at a carrier surface and also at a preferably parallel or preferably concentric surface. A freeform Fresnel surface 100 is illustrated by way of example in FIG. 1. The figure shows the individual Fresnel facets 102 with their respective Fresnel segments surfaces 104 and trailing edges 106 and the intersecting lines 108 with the carrier surface. The carrier surface can be plane or curved. Their origin coincides with the origin of the polynomial. The origin of the preferably parallel or preferably concentric surface is offset by a specific absolute value in the z-direction and creates the structure depth of the Fresnel segment surface.

DE 10 2009 010 537 A1 and DE 10 2009 010 538 A1 include examples of freeform Fresnel surfaces, wherein the latter document also describes a method for producing a freeform Fresnel surface. Freeform Fresnel surfaces are used for example in smart glasses or similar apparatuses, as are described for example in U.S. Pat. No. 5,369,415, in U.S. Pat. No. 6,204,974 B1, in US 2010/0260455 A1 or WO 2006/013565 A1.

The production of the freeform Fresnel surface (either as an original part or as an injection mold for example for industrial production) is effected by the infeed of a cutting tool in the direction of the z-axis up to the z-value given for the respective x-y-position by the mathematical description.

SUMMARY

An object herein is providing an advantageous method for producing freeform Fresnel surfaces. A second object is providing a method for creating an advantageous construction data set for producing a freeform Fresnel surface. A third objective is to provide an advantageous freeform Fresnel surface, and it is a fourth object to provide an advantageous spectacle lens.

In the method for producing a freeform Fresnel surface having a number of Fresnel facets that each have a Fresnel segment surface and a trailing edge, the freeform Fresnel surface is produced by way of machining a base body on the basis of construction data for the freeform Fresnel surface. The construction data for the freeform Fresnel surface can be based on:
- a carrier surface of the freeform Fresnel surface, which is defined in a coordinate system with an x-direction, a y-direction and a z-direction;
- a family of freeform surfaces which are staggered in the z-direction of the coordinate system and inclined with respect to the x-x-plane of the carrier surface, wherein each of the freeform surfaces defines in each case the Fresnel segment surface of a Fresnel facet;
- a family of intersection curves along which the freeform surfaces of the family of freeform surfaces intersect the carrier surface;
- circular cylinder surfaces or cone surfaces whose circular cylinder axes or cone axes are perpendicular to the x-y-plane of the coordinate system, wherein each circular cylinder surface or cone surface intersects in each case a specific freeform surface from the family of freeform surfaces at the height of the carrier surface and additionally cuts the freeform surface arranged in each case in the z-direction directly below the specific freeform surface, with the result that the intersection with the specific freeform surface defines an upper intersection line and the intersection with the freeform surface that is arranged in the z-direction immediately below it defines a lower intersection line. The region of the circular cylinder surface or cone surface extending between the upper intersection line and the lower intersection line then defines the trailing edge of the Fresnel facet belonging to the selected freeform surface.

Producing the freeform Fresnel surface is then effected by way of forming the Fresnel segment surfaces and the trailing edges of the Fresnel facets by circular-path-shaped machining of the base body based on the construction data, wherein material is removed from the base body until the Fresnel segment surface and the trailing edge are exposed for every Fresnel facet.

For the production of the surface by machining it is advantageous if the movement of the tool used for the production can follow a circular path that is projected onto the x-y-plane. In the prior art, this is not possible in the region of the border of the Fresnel facets and in particular in the case of the trailing edges because the projection of the spatial intersection curves that define the shape onto the x-y-plane does not produce an arc. In the method according to the invention, however, the projection of the peripheries of the Fresnel facets onto the x-y-plane represents circular paths due to the use of the circular cylinder surfaces or cone surfaces for creating the construction data. Hereby, the production of the Fresnel segment surfaces and of the trailing edges using a tool that is guided on concentric circular paths becomes possible. In other words, in circular-path-shaped machining of the base body, the movement of the used tool can follow a circular path that is projected onto the x-y-plane, which simplifies the control of the machine tool for machining the freeform Fresnel surface. The infeed values of the used tool in the z-direction that are required for the circular-path-shaped machining of the base body can be converted into cylinder coordinates taking into account the position of the circular cylinder axis or of the cone axis.

Within the framework of the method it is advantageous when the origin of the coordinate system for the description of the freeform Fresnel surface is defined such that it is located centrally in the carrier surface, with the result that a compensation plane which is disposed through the freeform Fresnel surface is perpendicular to the z-axis of the system.

It is furthermore advantageous when the shape of the circular cylinder surfaces or cone surfaces is constructed such that the upper intersection lines are best approximated in each case to the shape of the intersection curve of the respective specific freeform surface with the carrier surface. This can be achieved in the case of circular cylinder surfaces by way of a suitable selection of the radius of the circular cylinder and in the case of cone surfaces by way of a suitable selection of the cone angle and of the distance of the cone tip from the x-y-plane. A good approximation of the upper intersection line to the shape of the intersection curve of the respective specific freeform surface with the carrier surface can be attained if a selected circular cylinder surface or cone surface is constructed such that it extends through the intersection curve end points of a selected intersection curve of the family of intersection curves and a point on the selected intersection curve that is located between the two intersection curve end points of said intersection curve. It is advantageous here if the point between the two intersection curve end points of the selected intersection curve is located at least approximately in the center between the two intersection curve end points. It is additionally advantageous if the selected intersection curve is an intersection curve that is located centrally in the family of intersection curves. The circular cylinder axes or cone axes of all other circular cylinder surfaces or cone surfaces are then selected such that they coincide with the circular cylinder axis or cone axis of the selected circular cylinder surface or cone surface. In addition, for all freeform surfaces, the circular cylinder surface or cone surface that is assigned to a specific freeform surface extends through a point on the intersection curve of said respective specific freeform surface with the carrier surface. Here, too, it is advantageous if the point on the intersection curve of the specific freeform surface with the carrier surface is located at least approximately in the center between the two intersection curve end points of the respective intersection curve.

A method for creating a construction data set for the production of a freeform Fresnel surface having a number of Fresnel facets that have in each case a Fresnel segment surface and a trailing edge is also provided. These methods can comprise the following steps:

defining a carrier surface of the freeform Fresnel surface, which is defined in a coordinate system with an x-direction, a y-direction and a z-direction;

defining a family of freeform surfaces which are staggered in the z-direction of the coordinate system and extend at an angle greater than 0 and less than 90 degrees relative to the carrier surface, wherein each of the freeform surfaces defines in each case the Fresnel segment surface of a Fresnel facet;

ascertaining a family of intersection curves along which the freeform surfaces of the family of freeform surfaces intersect the carrier surface;

ascertaining circular cylinder surfaces or cone surfaces whose circular cylinder axes or cone axes are perpendicular to the x-y-plane of the coordinate system, wherein the circular cylinder surfaces or cone surfaces intersect in each case a specific freeform surface from the family of freeform surfaces at the height of the carrier surface and additionally cuts the freeform surface arranged in each case in the z-direction directly below the specific freeform surface, with the result that the intersection with the specific freeform surface defines an upper intersection line and the intersection with the freeform surface that is arranged in the z-direction immediately below it defines a lower intersection line. The region of the circular cylinder surface or cone surface extending between the upper intersection line and the lower intersection line then defines the trailing edge of the Fresnel facet belonging to the selected freeform surface.

Creating the construction data set typically also comprises ascertaining cylinder coordinates for forming the Fresnel segment surfaces and trailing edges of the Fresnel facets by way of circular-path-shaped machining of the base body using a machining tool, wherein the required infeed values for the tool in the z-direction are ascertained taking into account the position of the circular cylinder axis or the cone axis.

Within the framework of the method for creating a construction data set, it is advantageous if the origin of the coordinate system for the description of the freeform Fresnel surface is defined such that it is located centrally in the carrier surface.

It is furthermore advantageous when the shape of the circular cylinder surfaces or cone surfaces is constructed such that the upper intersection lines are best approximated in each case to the shape of the intersection curve of the respective specific freeform surface with the carrier surface. This can be done for example by way of a selected circular cylinder surface or cone surface being constructed by being arranged such that it extends through the intersection curve end points of a selected intersection curve of the family of intersection curves and a point on the selected intersection curve that is located between the two intersection curve end points of said intersection curve. It is advantageous here if the point between the two intersection curve end points of the selected intersection curve is disposed at least approximately in the center between the two intersection curve end points. It is additionally advantageous if an intersection curve that is located centrally in the family of intersection curves is selected as the selected intersection curve. The circular cylinder axes or cone axes of all other circular cylinder surfaces or cone surfaces are then arranged such that they coincide with the circular cylinder axis or cone axis of the selected circular cylinder surface or cone surface. In addition, the circular cylinder surface or cone surface that is assigned to a specific freeform surface is arranged such that it extends through a point on the intersection curve of the specific freeform surface with the carrier surface. Here, too, it is advantageous if the point on the intersection curve of the specific freeform surface with the carrier surface is located at least approximately in the center between the two intersection curve end points of the respective intersection curve.

Both in the method for producing a freeform Fresnel surface and in the method for creating a construction data set, it is possible, if the circular cylinder surfaces or cone surfaces are circular cylinder surfaces, for cone surfaces to be disposed through the Fresnel segment surfaces after the construction of the Fresnel segment surfaces and the trailing edges using the circular cylinder surfaces, with the associated cones being dimensioned with respect to their cone angle and the position of their tips above the x-y-plane such that they continuously intersect in each case two adjacent Fresnel segment surfaces and with the section of the cone surface located between the intersection lines of a cone surface with the adjacent Fresnel segment surfaces forming the trailing edge between the adjacent Fresnel segment surfaces. In this refinement of the method, the trailing edges are not parallel with respect to the z-direction, which simplifies the production of the trailing edges by cutting. If the circular cylinder surfaces or cone surfaces are cone surfaces, this development is not necessary.

Further provided is a computer program product, having software components for performing one of the methods provided herein.

Furthermore provided herein is a freeform Fresnel surface having a number of Fresnel facets that have in each case a Fresnel segment surface and a trailing edge and having a structure depth, which is defined in a coordinate system with an x-direction, a y-direction and a z-direction along the z-direction. In the freeform Fresnel surface according to the invention, the Fresnel segment surfaces and the trailing edge are bounded in each case by lines the projection of which onto the x-y-plane of the coordinate system are circle line sections in the x-y-plane, which is advantageous for the machining during the production of the freeform Fresnel surface, because the movement of the tool used for the production can follow a circular path that is projected onto the x-y-plane.

A spectacle lens can be equipped with a freeform Fresnel surface as provided herein. The use of such a freeform Fresnel surface is advantageous in the spectacle lens with respect to the production of said surface because the movement of the tool used for the production of the freeform Fresnel surface can follow a circular path that is projected onto the x-y-plane.

Further features, properties and advantages of the present invention will become apparent from the following description of exemplary embodiments with reference to the accompanying figures.

BRIEF DESCRIPTION OF THE DRAWINGS

FIG. 12 shows a spectacle lens having a freeform Fresnel surface.

Figure 1:
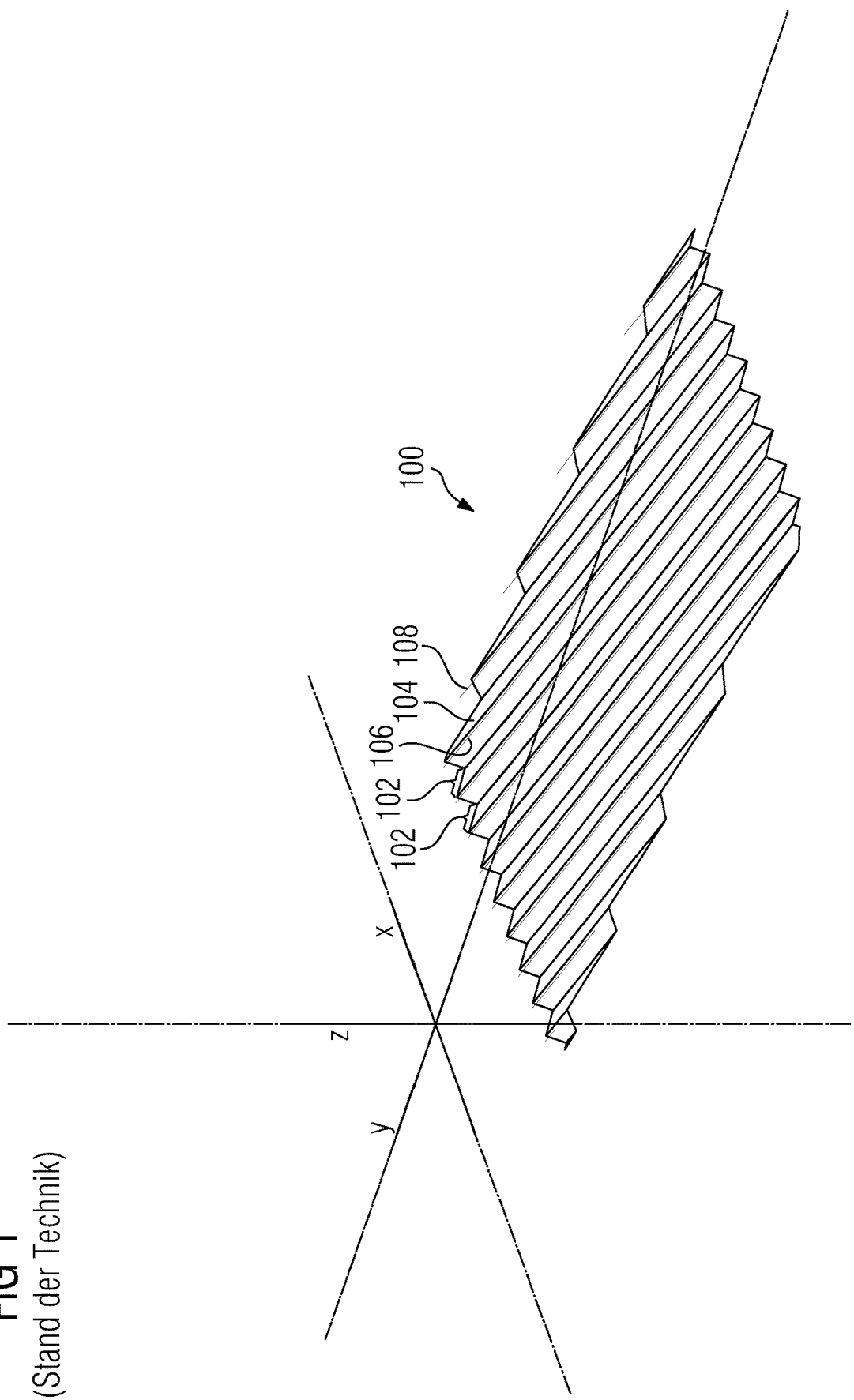
FIG. 1 shows an example of a freeform Fresnel surface according to the prior art.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

DETAILED DESCRIPTION

In the following descriptions, the present invention will be explained with reference to various exemplary embodiments. Nevertheless, these embodiments are not intended to limit the present invention to any specific example, environment, application, or particular implementation described herein. Therefore, descriptions of these example embodiments are only provided for purpose of illustration rather than to limit the present invention.

Before discussing an exemplary embodiment of the invention, an example for producing a freeform Fresnel surface as per a method according to the prior art will be explained with reference to FIGS. 2 and 3.

Figure 2:
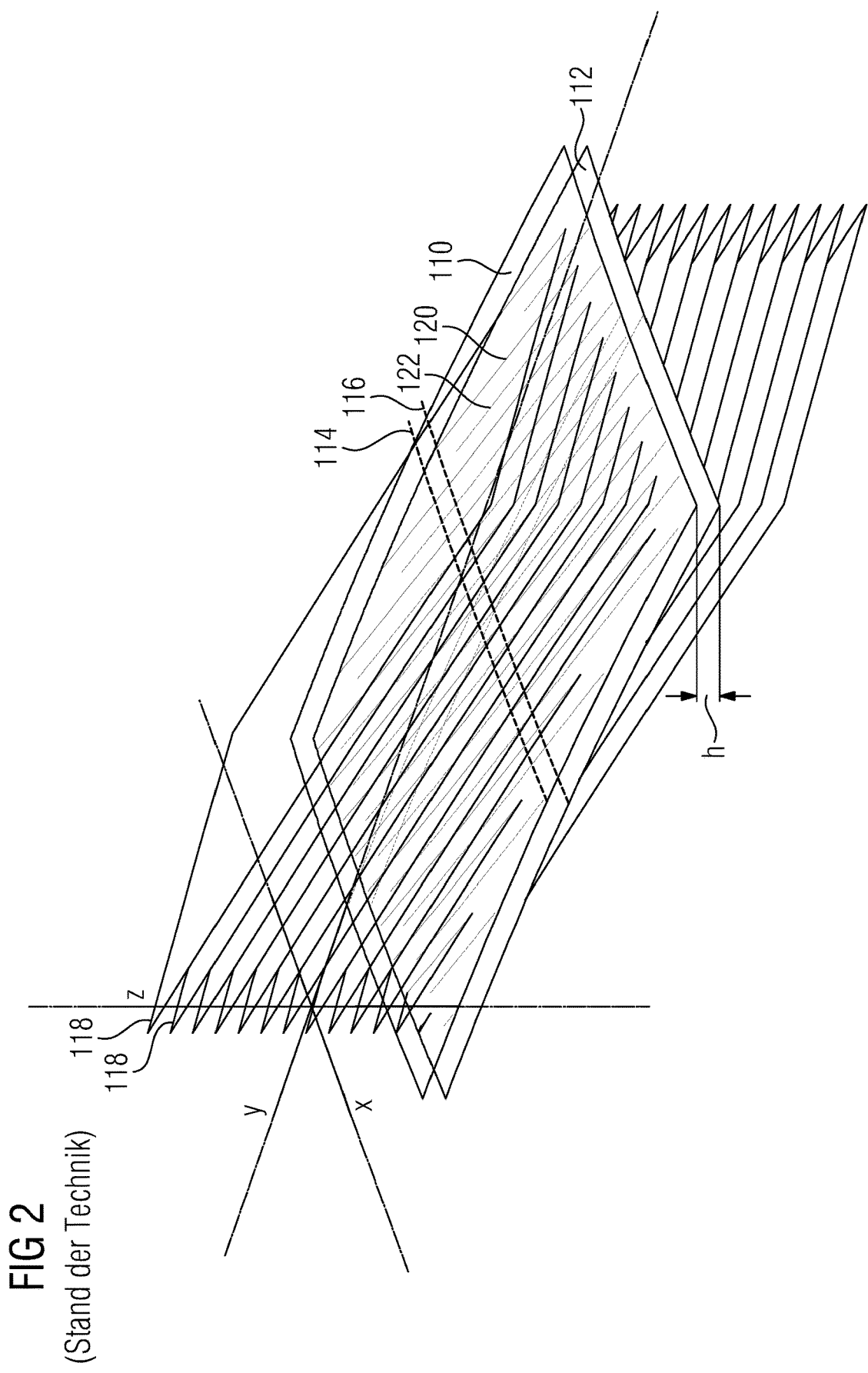
FIG. 2 shows a step in a method for producing a freeform Fresnel surface according to the prior art.

As is illustrated in FIG. 2, in the method according to the prior art, the origin of the freeform Fresnel surface lies outside the used surface (surface aperture). The curvatures of carrier surface 110 and concentric surface 112 are illustrated by equatorial lines 114, 116. The distance h between the two surfaces 110, 112 in the direction of the z-axis creates the structure depth and thus the width of the individual Fresnel segment surfaces 104.

In mathematical terms, the freeform Fresnel surface is described as follows:

$$z = z_F - h \cdot \left[\text{floor}\left(\frac{z_F - z_T}{h}\right)\right]$$

where:

$$z_T = \frac{c_T \cdot r^2}{1 + \sqrt{1 - (1 + k_T) \cdot c_T^2 \cdot r^2}}$$

$$z_F = \frac{c_F \cdot r^2}{1 + \sqrt{1 - (1 + k_F) \cdot c_F^2 \cdot r^2}} + \sum_{i=1}^{N} A_i(x, y)$$

$$r^2 = x^2 + y^2$$

Here, the index "F" designates the variables of the freeform Fresnel surface, while the index "T" designates the variables of the carrier surface 110. The letter h designates the structure depth of the Fresnel segment surface, c the curvature, and k the conicity of the respective surface. A designates the coefficients of the freeform surface.

FIG. 2 shows the construction of the freeform Fresnel surface in accordance with the mathematical description. It illustrates freeform surfaces 118 which are staggered in the z-direction and the carrier surface 110 with the concentric surface 112. Each of the freeform surfaces 118 produces in each case a spatial intersection curve 120, 122 with the carrier surface 110 and the concentric surface 112, with the shape of said intersection curve 120, 122 depending on the shape of the freeform surface 118 and the curvature of the carrier surface and the concentric surface. (The uppermost and lowermost freeform surfaces intersect in each case only the carrier surface and concentric surface, respectively). The intersection curves (120, 122) produced form the respectively outer and inner boundary of the individual Fresnel segment surfaces 104. FIG. 3 illustrates the Fresnel segment surfaces 104 produced by cutting the freeform surfaces 118.

Figure 3:
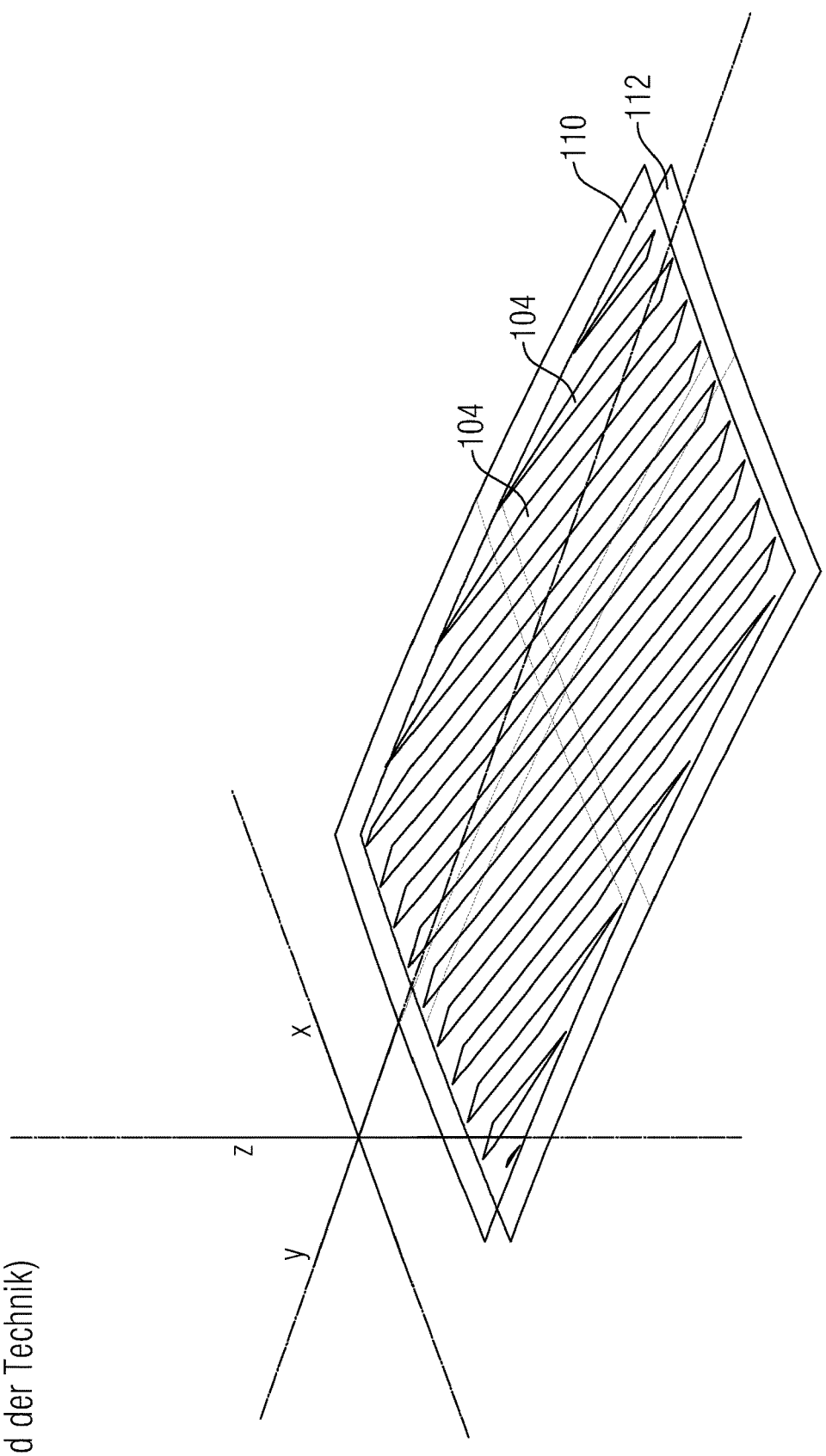
FIG. 3 shows a further step in the method for producing a freeform Fresnel surface according to the prior art.

Up to the state illustrated in FIG. 3, the constructed surface corresponds to the mathematical description. A real surface produced in a piece of material, e.g., by way of machining, however, also has the trailing edges 106 between the Fresnel segment surfaces, which can be seen in FIG. 1. The trailing edges 106 can be inclined relative to the x-y-plane (e.g., for technological reasons). They follow, e.g., the intersection curves on the concentric surface 112 and bound the Fresnel segment surfaces before they intersect the carrier surface 110.

An exemplary embodiment for the method according to the invention for creating a construction data set for producing a freeform Fresnel surface will be described below with reference to FIGS. 4 to 7.

Figure 4:
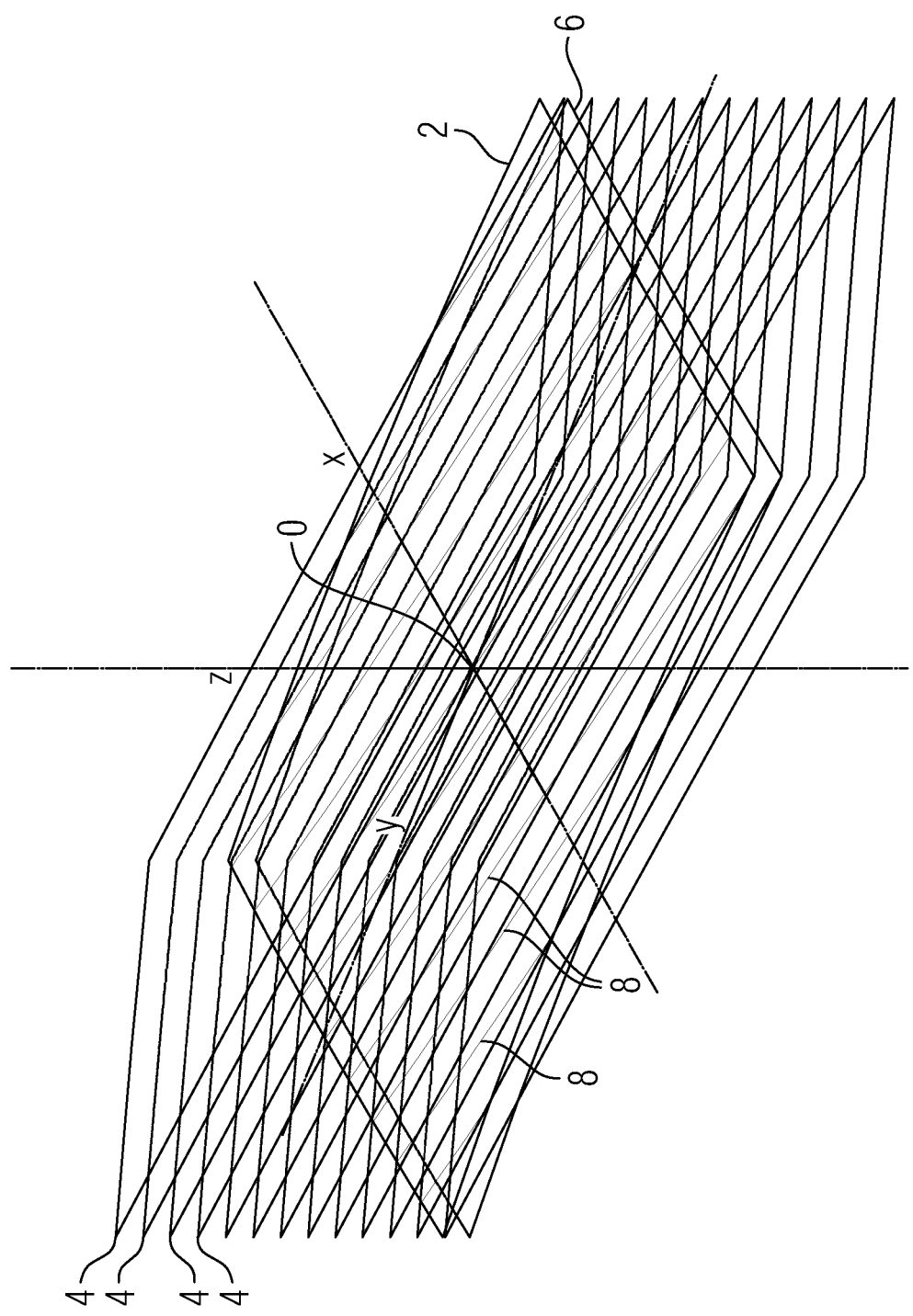
FIG. 4 shows a first step of an exemplary embodiment for the method according to the invention for creating a construction data set for the production of a freeform Fresnel surface.

In the first step of the method, the origin 0 of the freeform Fresnel surface is located approximately centrally in the used surface aperture, with the result that a compensation plane (x-y-plane) that is disposed through the freeform Fresnel surface is perpendicular with respect to the z-axis of the system. This is shown in FIG. 4, which not only shows the origin 0 but also the carrier surface 2, the freeform surfaces 4 and the concentric surface 6.

Within the framework of the method according to the invention, for a family of freeform surfaces 4 which are staggered in the z-direction and inclined relative to the x-y-plane of the carrier surface such that they intersect the carrier surface 2, the intersection curves 8 with the carrier surface 2 are ascertained, as in the prior art. As a result, a family of intersection curves 8, which each represent the intersection of a freeform surface 4 with the carrier surface 2, are obtained, wherein each freeform surface 4 defines a later Fresnel segment surface 10 (see FIG. 7).

Figure 5:
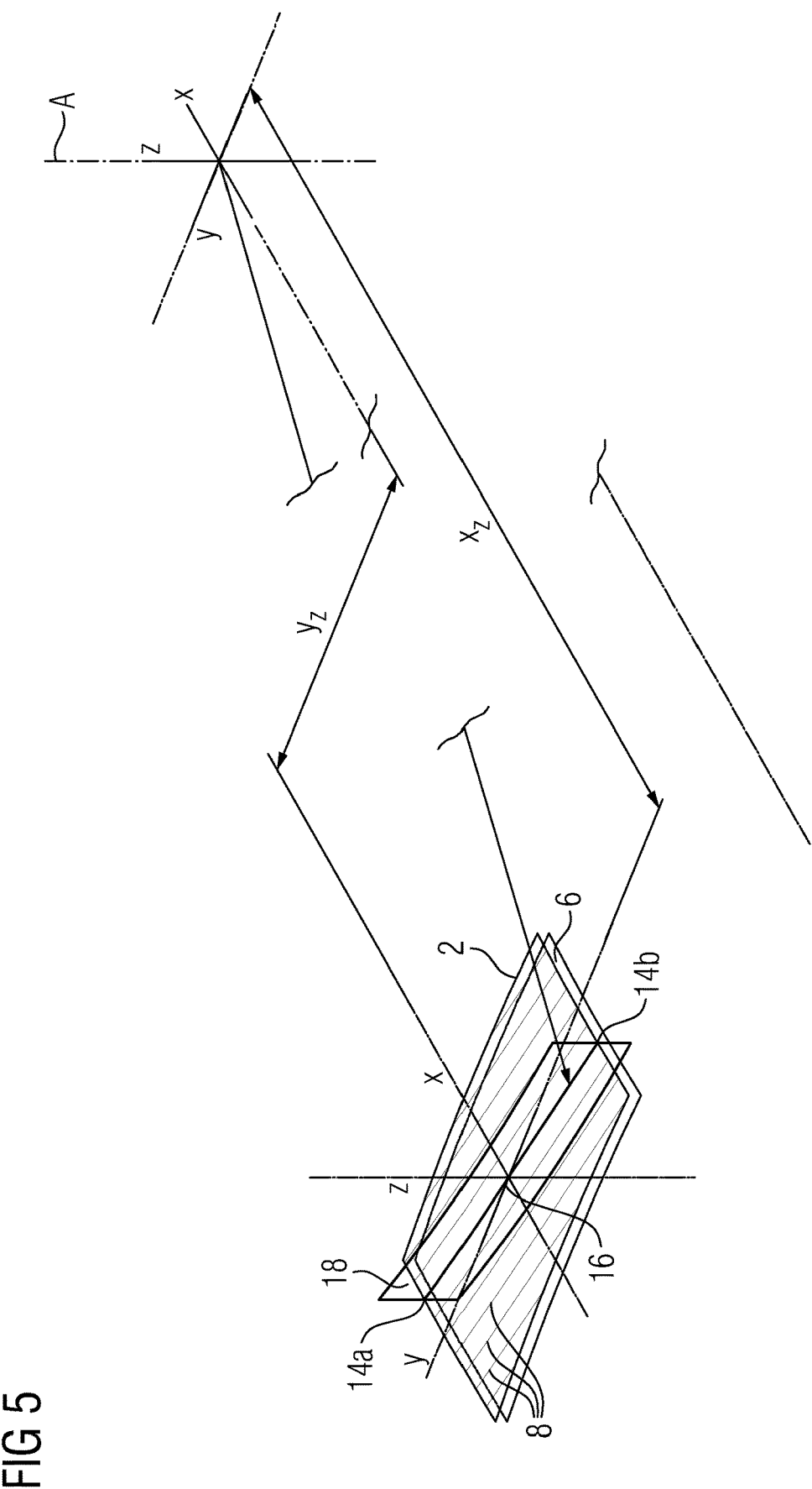
FIG. 5 shows a further step of the exemplary embodiment of the method according to the invention.

In the next step, illustrated graphically in FIG. 5, a circular cylinder surface 18, whose circular cylinder axis A is perpendicular to the x-y-plane, is placed through the end points 14a, 14b and a center point 16 of a selected (central, in the present exemplary embodiment) section curve 8. The position of the circular cylinder axis A with reference to the origin 0 of the freeform Fresnel surface is described by the coordinates $x_z$ and $y_z$. The position of the circular cylinder axis A is illustrated in the figure in shortened form due to a lack of space.

Due to the described type of positioning of the circular cylinder surface 18, the latter intersects the freeform surface 4 belonging to the intersection curve 8 in the region of the carrier surface 2 and forms an intersection line 20 which is best approximated to the intersection curve 8 (see FIG. 7), which will be referred to as upper intersection line 20 below. The projection of the upper intersection line 20 onto the x-y-plane then represents a section from a circle line which is best approximated to the projections of the intersection curves 8 onto the x-y-plane. Moreover, the circular cylinder surface 18 also intersects the freeform surface that is located in the family of freeform surfaces 4 directly below the freeform surface 4 producing the intersection curve 8. The intersection line 22 of the circular cylinder surface 18 with said freeform surface will be referred to as lower intersection line 22 below. The projection of the lower intersection line onto the x-y-plane also represents a section from a circle line.

Figure 6:
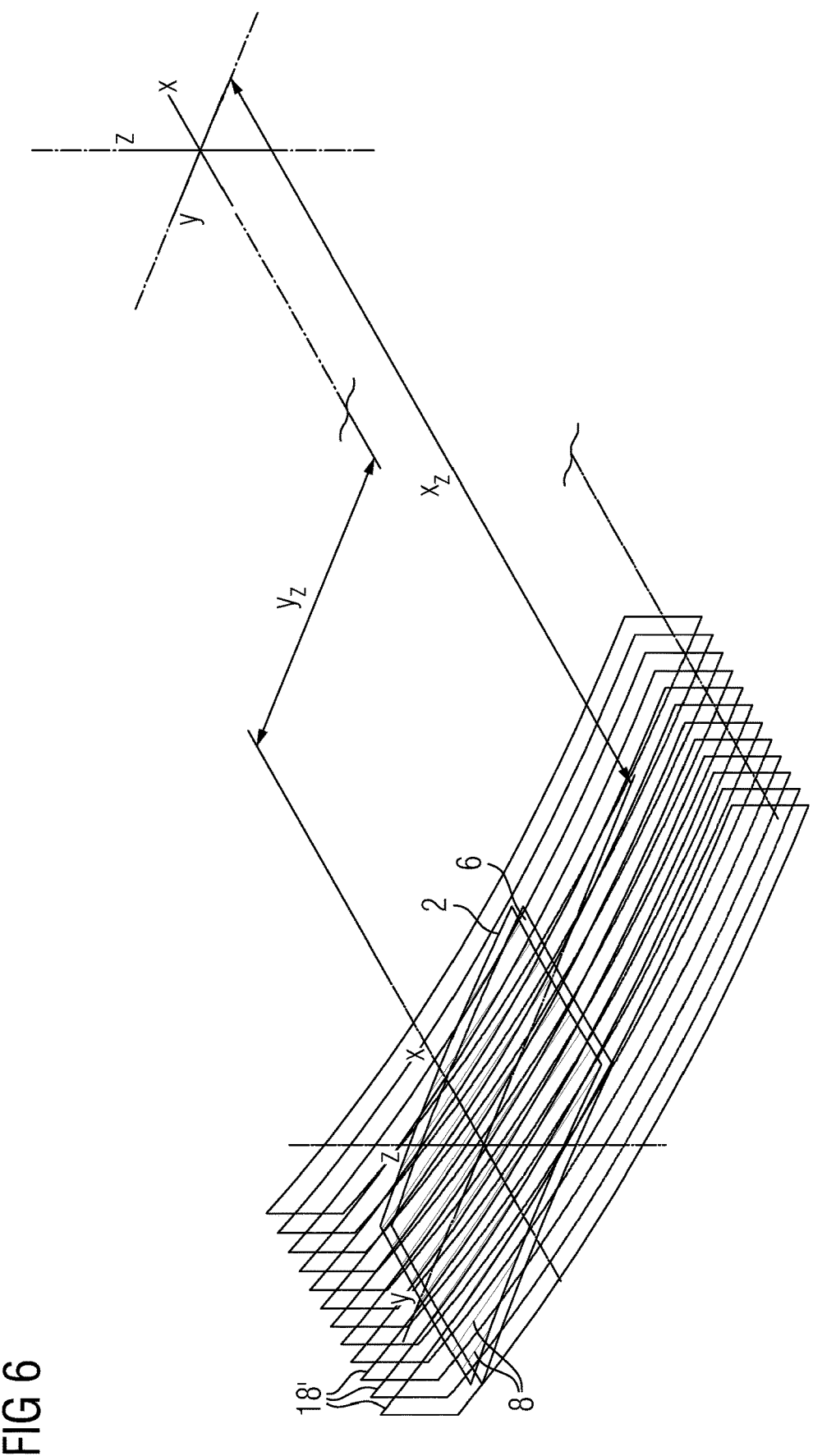
FIG. 6 shows yet a further step of the exemplary embodiment of the method according to the invention.
Figure 7:
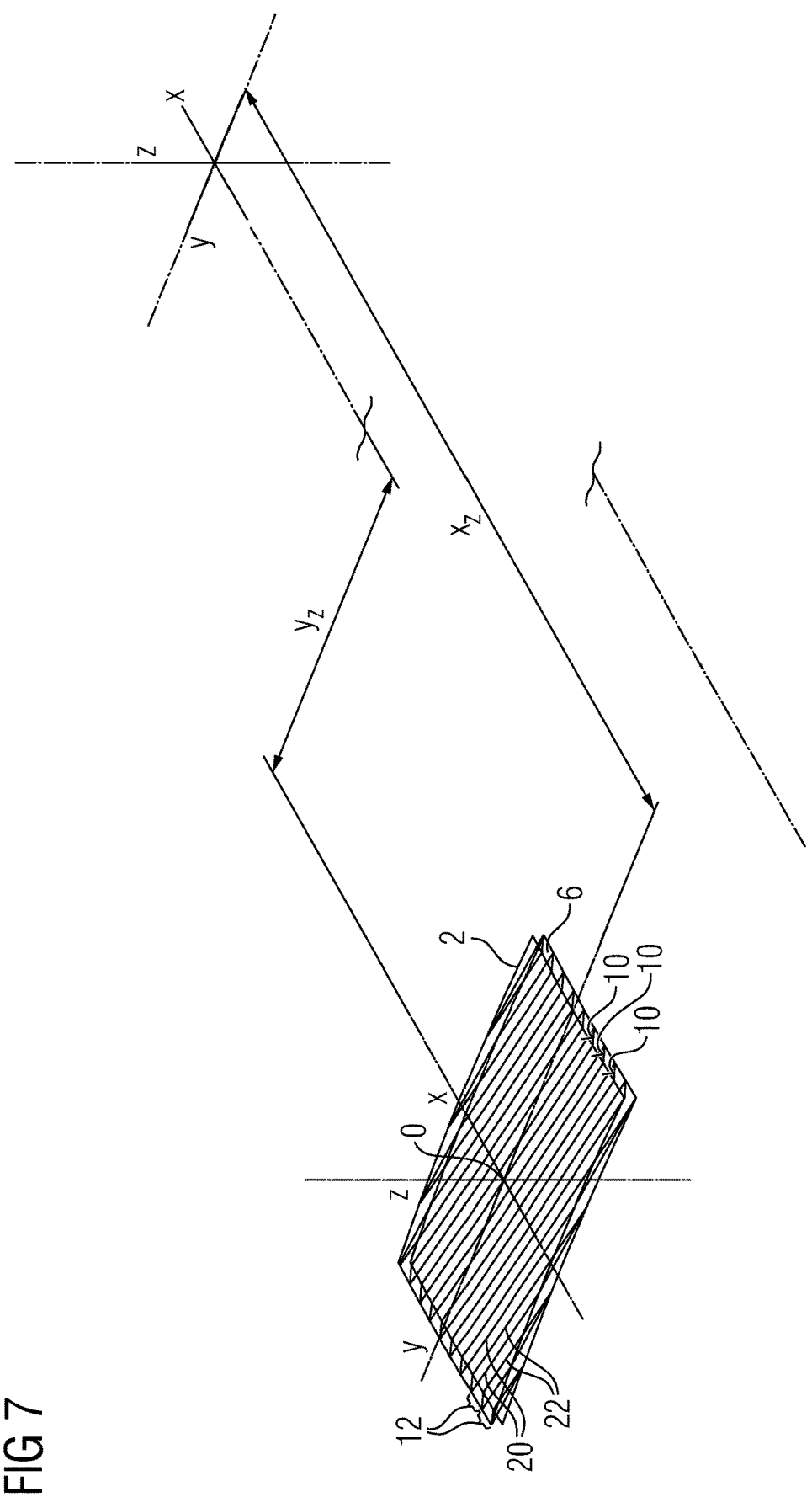
FIG. 7 shows yet a further step of the exemplary embodiment of the method according to the invention.

In a next step, which is graphically illustrated in FIG. 6, for each intersection curve 8 of a freeform surface 4 with the carrier surface 2, a circular cylinder surface 18' is disposed through a center point on the respective intersection curve 8, wherein the axis of said circular cylinder surface 18' coincides with the previously produced circular cylinder axis A. As a result, a set of concentric circular cylinder surfaces 18, 18' is obtained, of which each intersects a specific freeform surface from the family of freeform surfaces 4 in the region of the carrier surface 2, wherein in each case an upper intersection line 20 is formed. Likewise, a lower intersection line 22 is formed for the intersection of the respective circular cylinder surface 18' with the freeform surface that is located under the specific freeform surface. Both the upper intersection lines 20 and the lower intersection lines 22 represent, in the projection onto the x-y-plane, in each case sections of circle lines, wherein the projection of an upper intersection line 20 onto the x-y-plane is best approximated to the projection of the intersection curve 8 of the corresponding freeform surface 4 with the carrier surface 2 onto the x-y-plane.

The upper intersection lines 20 and the lower intersection lines 22 within the framework of the invention define the outer and inner boundaries of the individual Fresnel segment surfaces 10 rather than the intersection curves of a freeform surface 4 with the carrier surface 2 and the concentric surface 6. Here, a circular cylinder surface 18, 18' is at the same time an outer boundary of a preceding Fresnel segment surface 10 and inner boundary of a subsequent Fresnel segment surface 10, which means that the surface section of the corresponding freeform surface 4 which is located between the upper intersection line 20 of a circular cylinder surface 18, 18' and the lower intersection line 22 of the circular cylinder surface 18, 18' adjacent to the former forms the Fresnel segment surface 10 of a Fresnel facet 12. The surface section of a circular cylinder surface 18, 18' located between the upper intersection line 20 and the lower intersection line 22 then forms the trailing edge of the Fresnel facet 12.

As a consequence of the described construction of the freeform Fresnel surface, the bounding edges of the Fresnel segment surfaces 10 are no longer located exactly on the carrier surface 2 and the concentric surface 6, but are bounded by circular path segments, viewed in the projection onto the x-y-plane. During machining of a base body for producing the freeform Fresnel surface, the movement of the tool used can therefore follow a circular path projected onto the x-y-plane. The movements of the tool used that are required for machining the base body in the form of a circular path can be given in the form of polar coordinates, wherein the infeed values of the tool in the z-direction can be expressed by the z-component of the cylinder coordinates.

A freeform Fresnel surface produced in accordance with the described exemplary embodiment for the method according to the invention would have trailing edges that are perpendicular to the x-y-plane. However, it is frequently advantageous both in technological and functional terms if the trailing edges are inclined relative to the x-y-plane. This means, together with the objective of guiding the machining tool along circular paths, a requirement for embodying the trailing edges in the form of a section of a cone surface results. Here, the axes of the cones should preferably coincide with the circular cylinder axes described in the first exemplary embodiment.

Figure 8:
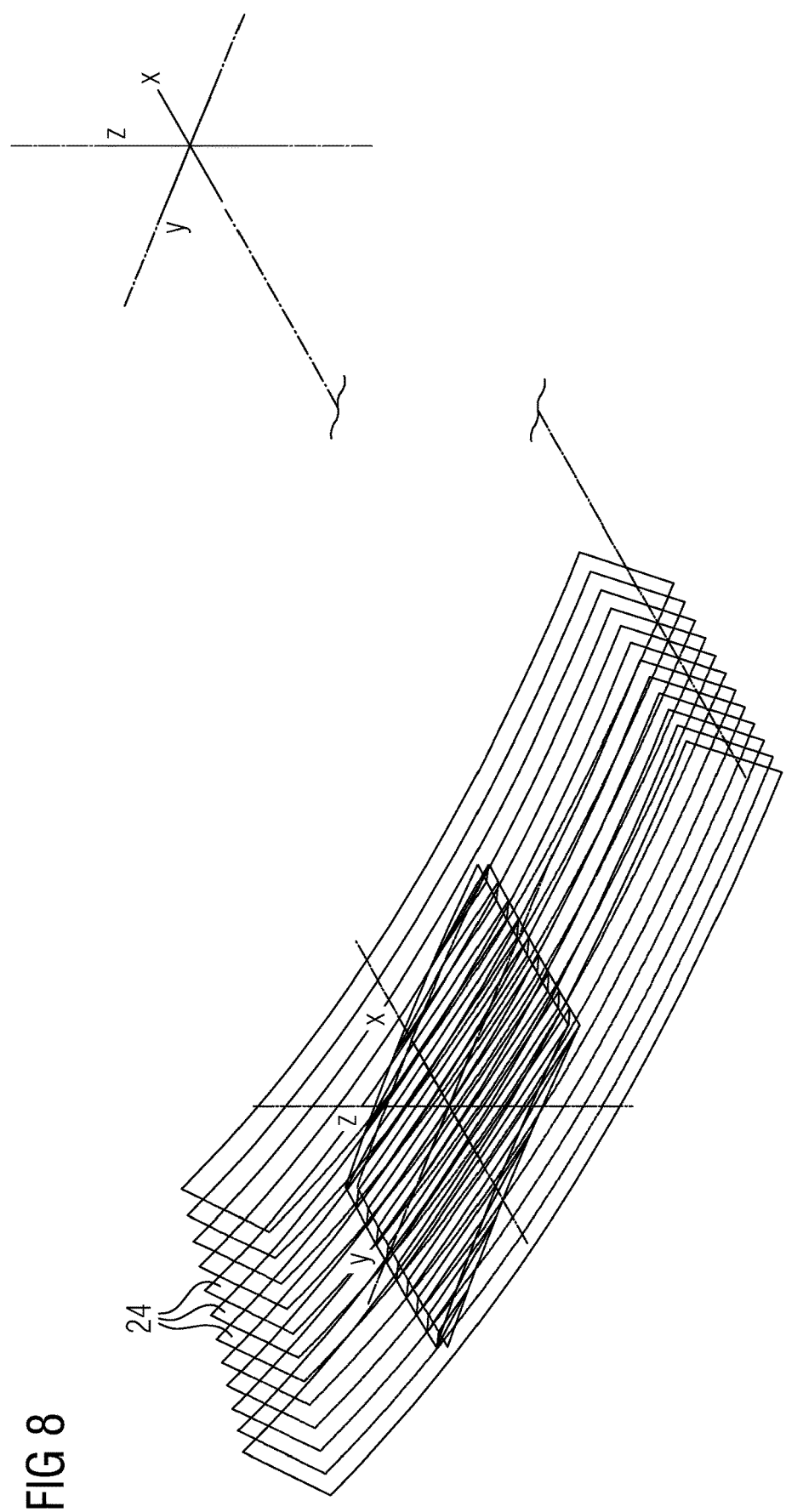
FIG. 8 shows cone surfaces used to generate construction data for inclined trailing edges of the Fresnel facets of a freeform Fresnel surface.

FIG. 8 illustrates the freeform Fresnel surface produced using the previously described method together with a set of coaxial cone surfaces 24. The associated cones are dimensioned with respect to their cone angle and the position of their tips above the x-y-plane such that they continuously intersect in each case two adjacent Fresnel segment surfaces 10, 10' (see FIGS. 9 and 10). Non-continuous intersection lines would create undefined gaps in the finished freeform Fresnel surface.

Figure 9:
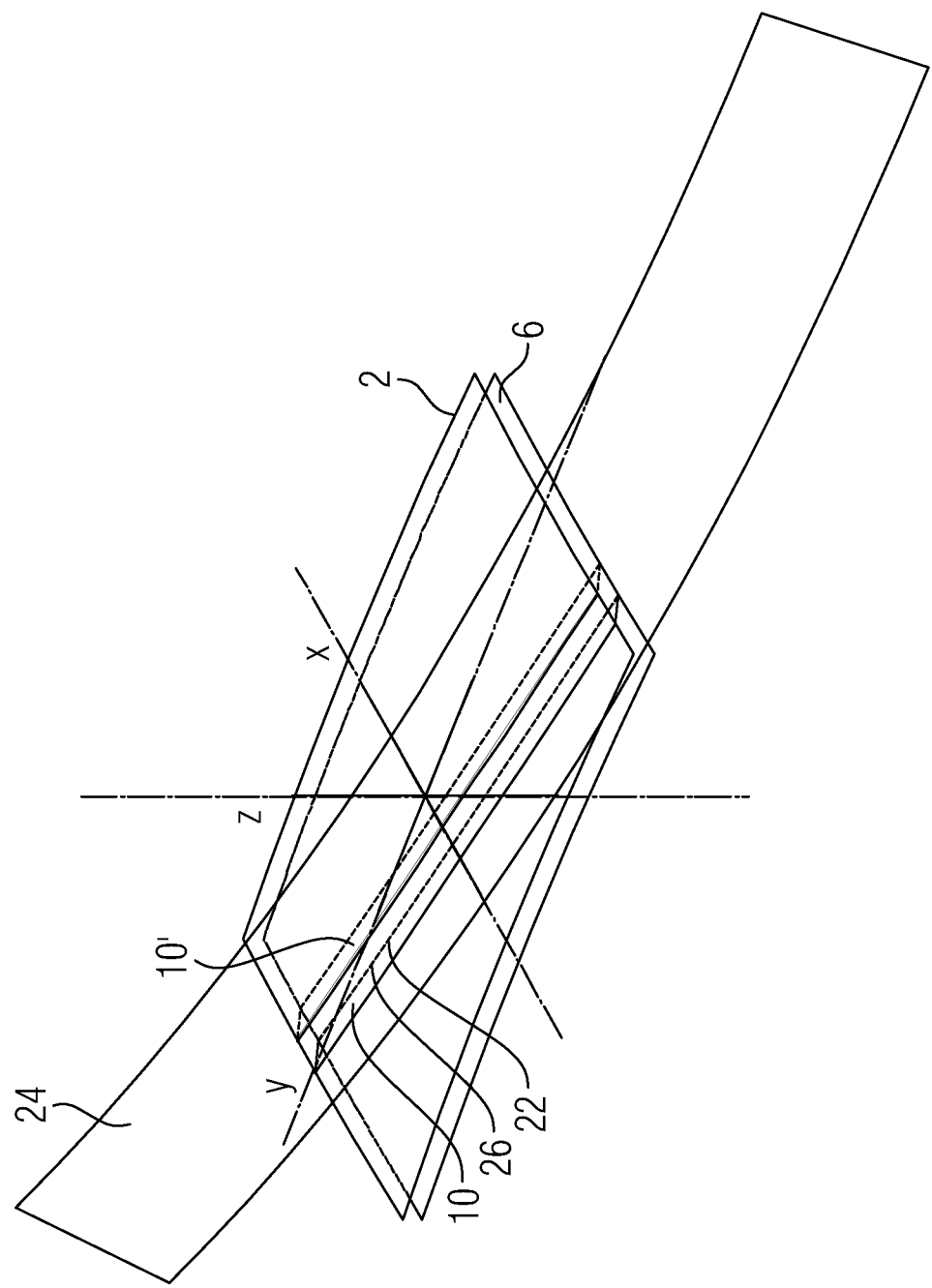
FIG. 9 shows a first illustration for explaining the dimensioning of the cone surfaces from FIG. 8.
Figure 10:
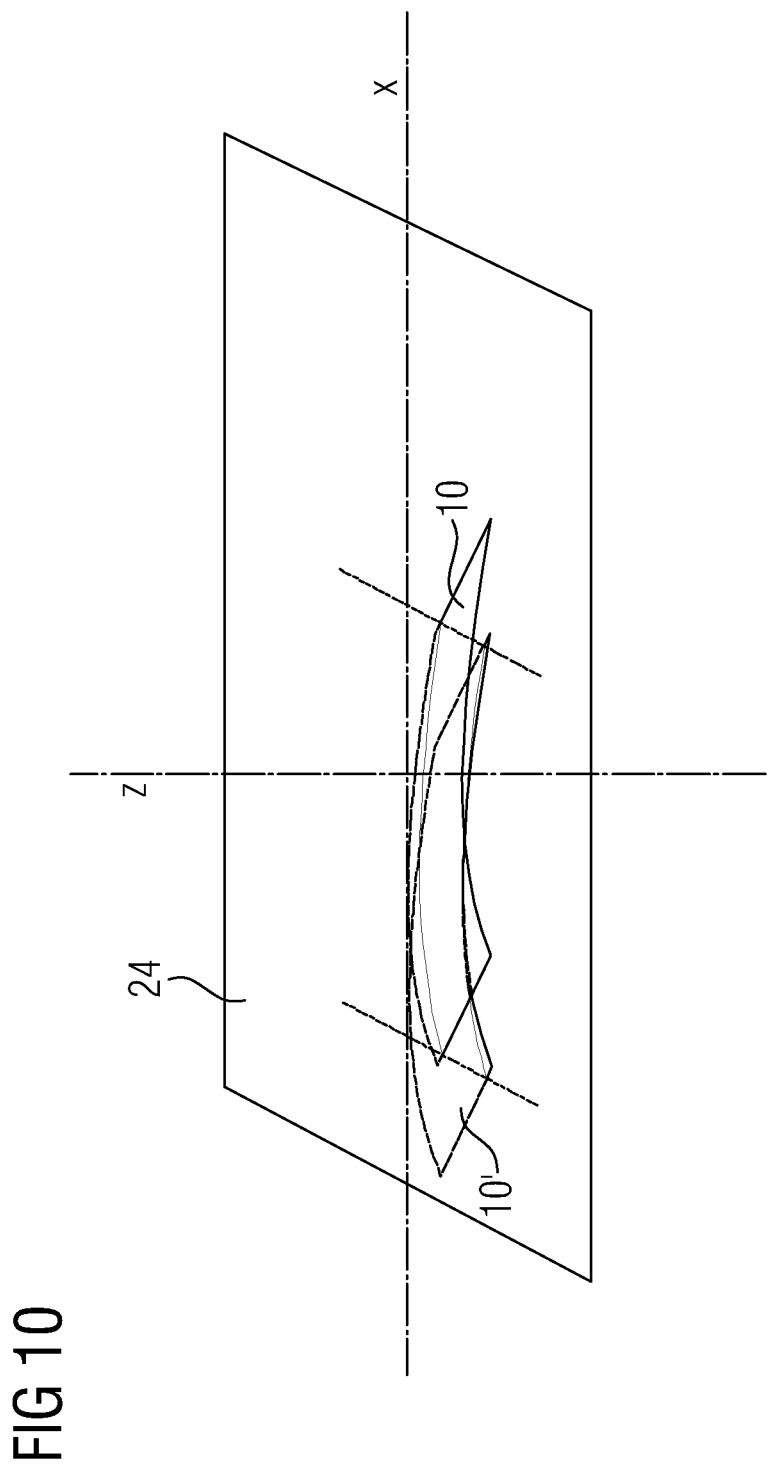
FIG. 10 shows a second illustration for explaining the dimensioning of the cone surfaces from FIG. 8.

Expedient dimensioning of the cone surfaces 24 is achieved when the intersection curve 26 of a cone surface 24 at the second one of the adjacent Fresnel segment surfaces 10, 10', that is to say the Fresnel segment surface 10', is tangent to the lower intersection line 22. In FIGS. 9 and 10, this dimensioning is illustrated using the example of a cone surface 24 and the two Fresnel segment surfaces 10, 10' it intersects. FIG. 9 here shows a cone surface and the two Fresnel segment surfaces 10, 10' it intersects in a perspective view. FIG. 10 shows the same arrangement with a view in the direction of the y-axis. The figure shows the intersection lines, produced by the cone surface 24, on the Fresnel segment surfaces 10, 10'. The portion of the segments that is located in the z-direction above the intersection line of the first segment 10 and the portion of the segments that is located in the z-direction below the intersection line of the second segment 10' is cut off by the cone surface.

The complete freeform Fresnel surface is formed by in each case alternating cutting of the Fresnel segment surfaces 10 and the cone surfaces 24, wherein the remaining sections of the cone surfaces 24 form the trailing edges 28 of the Fresnel facets (12).

Figure 11:
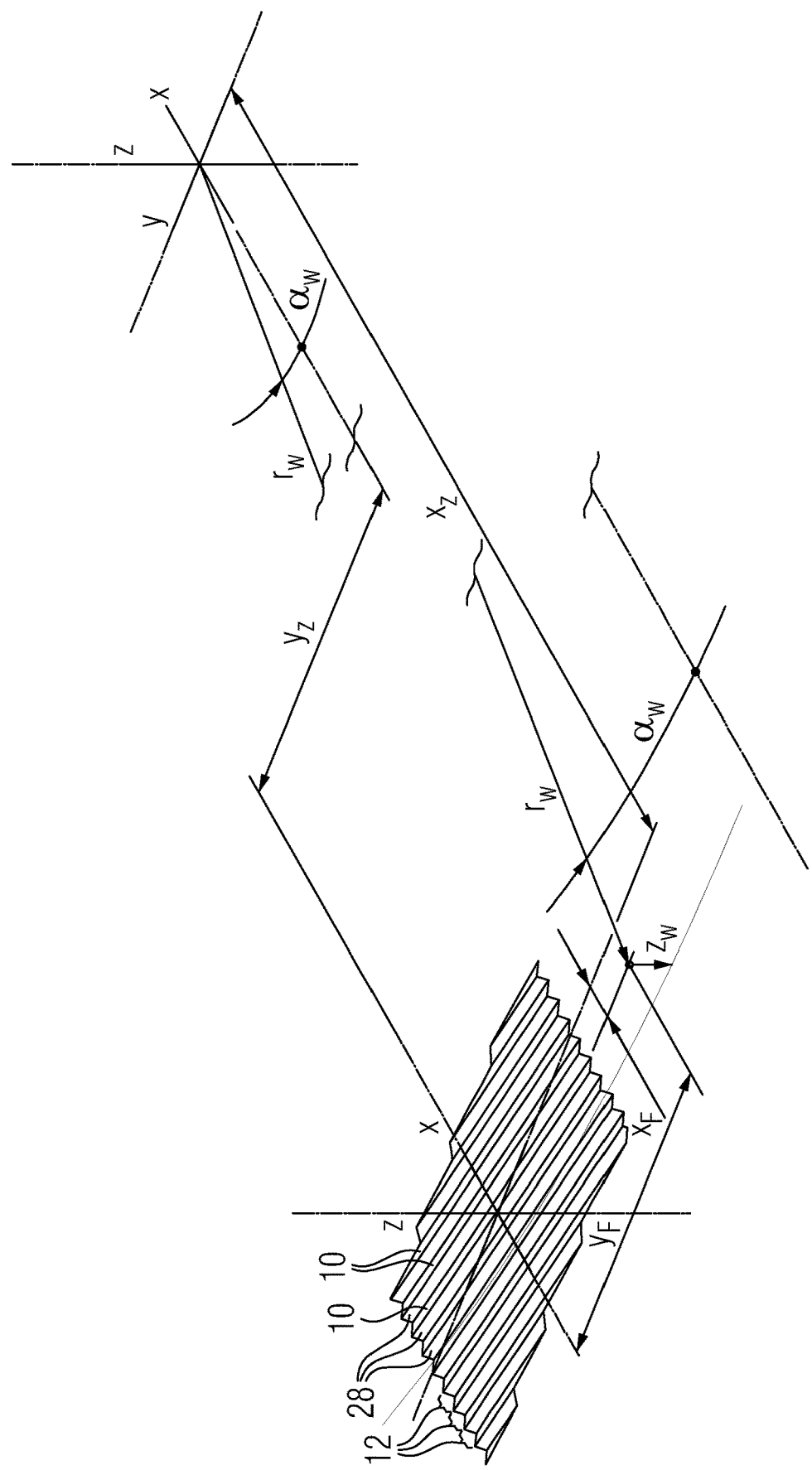
FIG. 11 shows a freeform Fresnel surface with inclined trailing edges.

For the production of the complete freeform Fresnel surface by way of circular-path-shaped movements of the tool, the respective infeed values $z_w$ of the tool in the z-direction, along which the structure depth of the freeform Fresnel surface is defined, is converted into polar coordinates of the machine tool taking into account the position of the cone axis $(x_z;y_z)$ of Cartesian coordinates of the mathematical description of the freeform Fresnel surface. FIG. 11 illustrates the finished freeform Fresnel surface and the relationships of the coordinates. The conversion is effected in accordance with the following equations:

$$z = z_w = f(x_F; y_F) = f(\alpha_w; r_w)$$

$$a_w = \arctan[(y_z - y_F)/(x_z - x_F)]$$

$$r_w = \sqrt{(x_z - x_F)^2 + (y_z - y_F)^2}$$

The index "F" designates the variables of the freeform Fresnel surface, while the index "W" designates the variables of the tool or the machine. The index Z designates the position coordinates of the cone axis.

Freeform Fresnel surfaces, as they are described in the present application, are used for example in the field of smart glasses. Smart glasses generally comprise, inter alia, at least one spectacle lens through which an imaging beam path originating from a display device is guided under multiple reflection at the spectacle lens surfaces to an output coupling structure, from which it is output-coupled from the spectacle lens in the direction of the eye of a user. An example of such a spectacle lens 100 is represented in FIG. 12. As shown in FIG. 12, the spectacle lens 200 may have a peripheral thickening region 206, in which the thickness of the spectacle lens 200 is increased in order to achieve optimum guidance of the imaging beam path 202 to the output coupling structure 204. The imaging beam path 202 is coupled into the spectacle lens 200 with the aid of a prism 208, which serves as an input coupling device. By way of the prism 208, which is occasionally also referred to as a tube, the imaging beam path 202 coming from a display (not shown) is coupled into the spectacle lens 200 at such an angle that it can reach the output coupling structure 204 under multiple reflections at the outer surface 201 and at the inner surface 203 of the spectacle lens 200. The output coupling structure 204 in the present example is in the form of a freeform Fresnel surface which was produced in accordance with the described method. For this reason, the Fresnel segment surfaces and the trailing edges of the freeform Fresnel surfaces are bounded in each case by lines the projection of which onto the x-y-plane of the coordinate system are circle line sections in the x-y-plane.

The present invention has been described in detail on the basis of an exemplary embodiment for explanatory purposes. It goes without saying, however, that the invention is not intended to be restricted to the present exemplary embodiment. Rather, a person skilled in the art will recognize that it is possible to deviate from the exemplary embodiments within the scope of the invention as is defined in the claims. For example, there is the possibility to use, instead of the circular cylinder surfaces, cone surfaces from the start, wherein the construction of the upper and lower intersection lines of the cone surfaces with the freeform surfaces from the family of freeform surfaces can be constructed as was described for the circular cylinder surfaces. Therefore, the invention is intended to be restricted only by the appended claims.

The invention claimed is:

1. A method for producing a freeform Fresnel surface that includes a plurality of Fresnel facets that each include a Fresnel segment surface and a trailing edge, the freeform Fresnel surface producing method comprising:
   machining a base body on the basis of construction data for the freeform Fresnel surface,
   wherein the construction data for the freeform Fresnel surface are based on:
      a carrier surface of the freeform Fresnel surface, which is defined in a coordinate system with an x-direction, a y-direction, a z-direction and an x-y plane;
      a family of freeform surfaces which are staggered in the z-direction of the coordinate system and inclined with respect to the x-y-plane of the carrier surface, wherein each of the freeform surfaces defines in each case the Fresnel segment surface of a Fresnel facet;
      a family of intersection curves along which the freeform surfaces of the family of freeform surfaces intersect the carrier surface such that projections of the family of intersection curves onto the x-y-plane are not circular arcs,
      a plurality of circular cylinder surfaces or cone surfaces whose circular cylinder axes or cone axes are perpendicular to the x-y-plane of the coordinate system, wherein each circular cylinder surface or cone surface intersects in each case a specific freeform surface from the family of freeform surfaces at the height of the carrier surface and additionally cuts the freeform surface arranged in each case in the z-direction directly below the specific freeform surface such that the intersection with the specific freeform surface defines an upper intersection line and the intersection with the freeform surface that is arranged in the z-direction immediately below it defines a lower intersection line such that projections of the upper and lower intersection lines onto the x-y-plane form circular arcs, and
      wherein the region of the circular cylinder surface or cone surface extending between the upper intersection line and the lower intersection line defines the trailing edge of the Fresnel facet belonging to the selected freeform surface;
   circular-path-shaped machining of the base body based on the construction data to produce the freeform Fresnel surface, the Fresnel segment surfaces and the trailing edges of the Fresnel facets, removing material from the base body until the Fresnel segment surface and the trailing edge are exposed for every Fresnel facet.

2. The method of claim 1, wherein an origin of the coordinate system for the description of the freeform Fresnel surface is defined such that it is located centrally in the carrier surface.

3. The method of claim 1, wherein a shape of the circular cylinder surfaces or cone surfaces is configured such that the upper intersection lines are approximated in each case to a shape of the intersection curve of the respective specific freeform surface with the carrier surface.

4. The method of claim 3,
wherein a selected circular cylinder surface or cone surface is configured such that it extends through a plurality of end points of the intersection of a selected intersection curve of the family of intersection curves and a point on the selected intersection curve that is located between two of the plurality of end points of said intersection curve,
wherein the circular cylinder axes or cone axes of all other circular cylinder surfaces or cone surfaces coincide with the circular cylinder axis or cone axis of the selected circular cylinder surface or cone surface, and
wherein for all freeform surfaces, the circular cylinder surface or cone surface that is assigned to a specific freeform surface extends through a point on the intersection curve of said specific freeform surface with the carrier surface.

5. The method of claim 4, wherein the point between the two intersection curve end points of the selected intersection curve is located at least approximately in a center between the two intersection curve end points.

6. The method of claim 4, wherein the selected intersection curve is an intersection curve that is located centrally in the family of intersection curves.

7. The method of claim 4, wherein the point on the intersection curve of the specific freeform surface with the carrier surface is located at least approximately in a center between the two intersection curve end points of the respective intersection curve.

8. The method of claim 1,
wherein the circular cylinder surfaces or cone surfaces are circular cylinder surfaces, and
wherein cone surfaces are disposed through the Fresnel segment surfaces after the construction of the Fresnel segment surfaces and the trailing edges using the circular cylinder surfaces, with the associated cones being dimensioned with respect to their cone angle and the position of their tips above the x-y-plane such that they continuously intersect in each case two adjacent Fresnel segment surfaces and with the section of the cone surface located between the intersection lines of a cone surface with the adjacent Fresnel segment surfaces forming the trailing edge between the adjacent Fresnel segment surfaces.

9. The method of claim 1, wherein, in the circular-path-shaped machining of the base body, the movement of a tool used to perform the machining follows a circular path that is projected onto the x-y-plane.

10. The method of claim 9, wherein the infeed values of the tool in the z-direction that are required for the circular-path-shaped machining of the base body are converted into cylinder coordinates taking into account the position of the circular cylinder axis or of the cone axis.

11. A method for the production of a freeform Fresnel surface having a number of Fresnel facets that have in each case a Fresnel segment surface and a trailing edge, the method comprising:
creating a construction data set by:
defining a carrier surface of the freeform Fresnel surface, which is defined in a coordinate system with an x-direction, a y-direction, a z-direction and an x-y plane;
defining a family of freeform surfaces which are staggered in the z-direction of the coordinate system and inclined with respect to the x-y-plane of the coordinate system, wherein each of the freeform surfaces defines in each case the Fresnel segment surface of a Fresnel facet;
ascertaining a family of intersection curves along which the freeform surfaces of the family of freeform surfaces intersect the carrier surface such that projections of the family of intersection curves onto the x-y-plane are not circular arcs;
ascertaining circular cylinder surfaces or cone surfaces whose circular cylinder axes or cone axes are perpendicular to the x-y-plane of the coordinate system, wherein each circular cylinder surface or cone surface intersects in each case a specific freeform surface from the family of freeform surfaces at the height of the carrier surface and additionally cuts the freeform surface arranged in each case in the z-direction directly below the specific freeform surface, with the result that the intersection with the specific freeform surface defines an upper intersection line and the intersection with the freeform surface that is arranged in the z-direction immediately below it defines a lower intersection line such that projections of the upper and lower intersection lines onto the x-y-plane form circular arcs, and
wherein the region of the circular cylinder surface or cone surface extending between the upper intersection line and the lower intersection line defines the trailing edge of the Fresnel facet belonging to the selected freeform surface, and
machining a base body based on the construction data to produce the freeform Fresnel surface.

12. The method of claim 11, further comprising:
ascertaining cylinder coordinates for forming the Fresnel segment surfaces and trailing edges of the Fresnel facets by way of circular-path-shaped machining of the base body using a machining tool,
wherein an infeed value required for the tool in the z-direction are ascertained taking into account the position of the circular cylinder axis or the cone axis.

13. The method of claim 11, wherein an origin of the coordinate system for the description of the freeform Fresnel surface is defined such that it is located centrally in the carrier surface.

14. The method of claim 11, wherein the shape of the circular cylinder surfaces or cone surfaces is configured such that the upper intersection lines are best approximated in each case to the shape of the intersection curve of the respective specific freeform surface with the carrier surface.

15. The method of claim 14,
wherein a selected circular cylinder surface or cone surface is constructed by being arranged such that it extends through a plurality of intersection curve end points of a selected intersection curve of the family of intersection curves and a point on the selected intersection curve that is located between two of the plurality of end points of said intersection curve,
wherein the circular cylinder axes or cone axes of all other circular cylinder surfaces or cone surfaces are arranged such that they coincide with the circular cylinder axis or cone axis of the selected circular cylinder surface or cone surface, and
wherein for all freeform surfaces, the circular cylinder surface or cone surface that is assigned to a specific freeform surface is arranged such that it extends through a point on the intersection curve of said specific freeform surface with the carrier surface.

16. The method of claim 15, wherein the point between the two intersection curve end points of the selected intersection curve is disposed at least approximately in a center between the two intersection curve end points.

17. The method of claim 15, wherein the selected intersection curve is an intersection curve that is located centrally in the family of intersection curves.

18. The method of claim 15, wherein the point on the intersection curve of the specific freeform surface with the carrier surface is disposed at least approximately in a center between the two intersection curve end points of the respective intersection curve.

19. The method of claim 11,
wherein the circular cylinder surfaces or cone surfaces are circular cylinder surfaces, and
wherein cone surfaces are disposed through the Fresnel segment surfaces after the construction of the Fresnel segment surfaces and the trailing edges using the circular cylinder surfaces, with the associated cones being dimensioned with respect to their cone angle and the position of their tips above the x-y-plane such that they continuously intersect in each case two adjacent Fresnel segment surfaces and with the section of the cone surface located between the intersection lines of a cone surface with the adjacent Fresnel segment surfaces forming the trailing edge between the adjacent Fresnel segment surfaces.

* * * * *